Patented Sept. 15, 1953

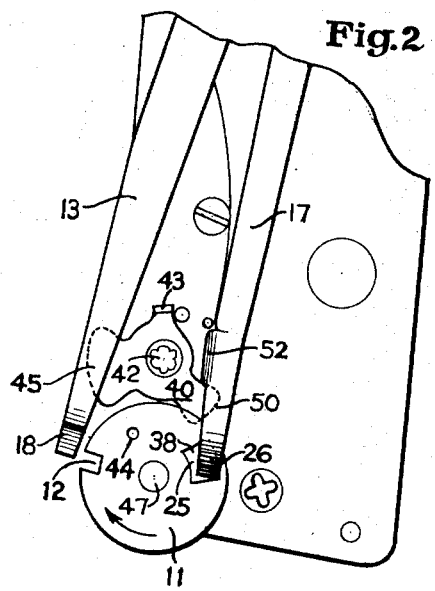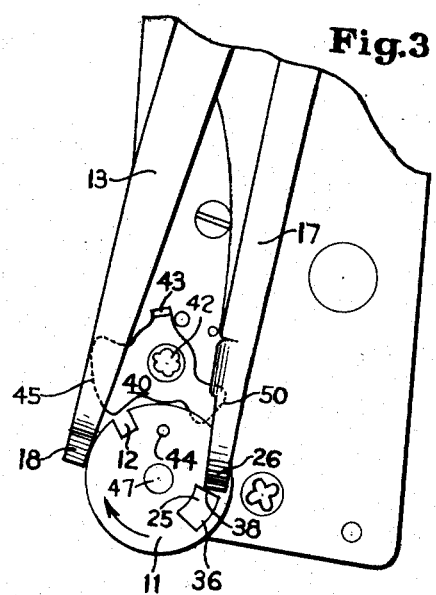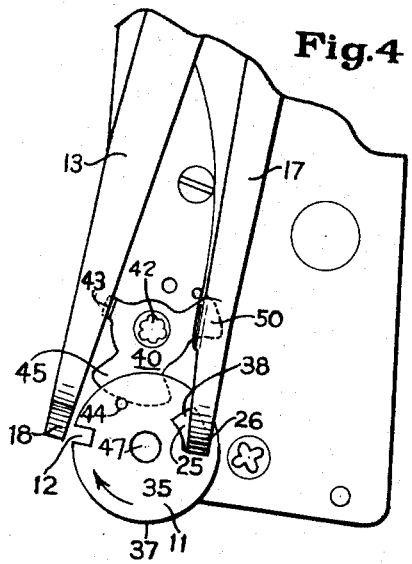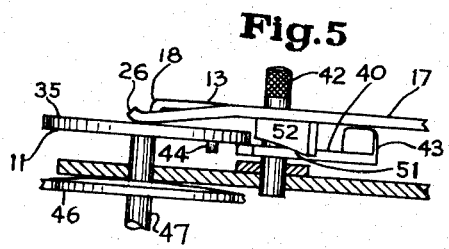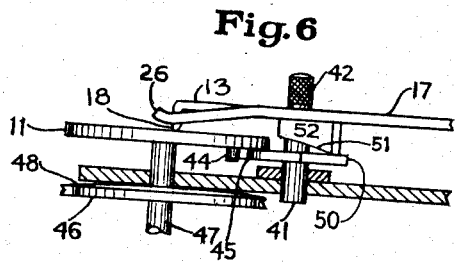

2,652,210

UNITED STATES PATENT OFFICE 2,652,210

FILM METERING AND PHASING MECHANISM

Howard T. Hodges, Rochester, N. Y., assignor to Eastman Kodak Company, Rochester, N. Y., a corporation of New Jersey Application July 27, 1950, Serial No. 176,169

14 Claims. (Cl. 242—71)

The present invention relates to roll film cameras and more particularly to a film metering mechanism therefor.

As is well known, in cameras of this type, it is desirable to provide a mechanism which will lock the film-winding or moving means automatically after each exposed image has been wound on the takeup spool or spindle, and an unexposed frame or area has been moved into exposing position. After the exposure has been made, it is necessary to release the previously locked spindle so that the exposed area may be wound, as is well known. Furthermore, it is desirable to provide an arrangement by which the takeup spindle locking-mechanism may be disengaged or rendered inoperative after the last exposure is made and wound up, so as to permit free winding of the trailer strip and the free winding of the leader strip of a new roll of film.

Accordingly, it is highly desirable to provide means for maintaining the elements of the locking-mechanism in proper phased relation so as to lock the winding mechanism successively only after each exposed area is moved, and not to disconnect the locking mechanism from the film until after the last exposure area is wound up on the takeup spool. Also, it is desirable to provide an arrangement by which the parts of the control for the locking mechanism are locked after winding of the last exposure so as to insure the retention of the proper phased relation of the entire mechanism so that the parts will be in the proper relative positions when a new film is ready for exposure. Thus, after the last exposure has been made, the winding mechanism is freed, but the control parts are locked to insure their proper phased relation. To secure this result, after the last exposure has been made, a manually controlled reload lever or member is rocked to bring a lug thereon into engagement with the locking mechanism to move the latter to an inoperative position to free the windup spindle to permit unobstructed winding of the trailer and leader strips. Also, the control mechanism is locked in a definite phased relation. Then, when the first image area of a new film is in position, the locking and control members are released and are rendered operative to lock the winding spindle, and the parts are then in proper phased relation.

In addition, it is sometimes desirable to remove a partially exposed film strip from the camera. In order to accomplish this result, it is desirable that the unexposed areas be successively wound off without further locking of the winding spindle. Also, such winding must be accomplished without changing the positions of the metering mechanism parts so as to insure the proper phased relation when a new film is positioned in the camera. To this end, the reload lever of the present invention may be rocked to move the locking mechanism to its inoperative position to free the spindle; and, at the same time, retain the metering disk in its proper phased position so that when a new film is positioned in the camera, the control and locking members will be in their proper relative and phased positions.

The present invention has as its principal object a simple and effective means for releasing the locking means after the last exposure has been made.

A still further object of the invention relates to the use of a releasing means for retaining the phased relation of the control parts.

Another object of the invention is the provision of a simple and effective means for retaining the locking means in an inoperative position during initial winding of each film area.

Yet another object of the invention is the provision of a releasing means which is simple and rugged in construction, inexpensive to make, easy to use and highly effective in its results.

To these and other ends, the invention resides in certain improvements and combinations of parts, all as will be hereinafter more fully described, the novel features being pointed out in the claims at the end of the specification.

In the drawings:

Fig. 2 is a partial view of the mechanism illustrated in Fig. 1, showing the relation of the parts after an exposure has been made and the winding spindle released to wind the film, showing the means for initially holding the locking and forwarding pawl out of engaging relation with a notch in the metering disk;

Fig. 3 is a view similar to Fig. 2, but at a slightly later time in the film-winding operation, showing the holding lever cammed out of holding relation so that the locking or forwarding pawl may move into a cooperative relation with the metering disk so as to be effective to lock the winding spindle at the end of the film-winding operation;

Fig. 4 is a view similar to Figs. 2 and 3, and shows the position of the reload lever after the last exposure has been made to hold the forwarding pawl in released position and retaining the metering disk against rotation so as to insure proper phased relation of the parts;

Fig. 5 is a side view of the metering disk and its associated parts with the reload lever in its inoperative position, as shown in Figs. 1–3; and Fig. 6 is a view similar to Fig. 5, but with the reload lever moved to its operative position, as shown in Fig. 4, showing the relation of the reload lever parts to the forwarding pawl and the metering disk.

Similar reference numerals throughout the various views indicate the same parts.

Figure 1:
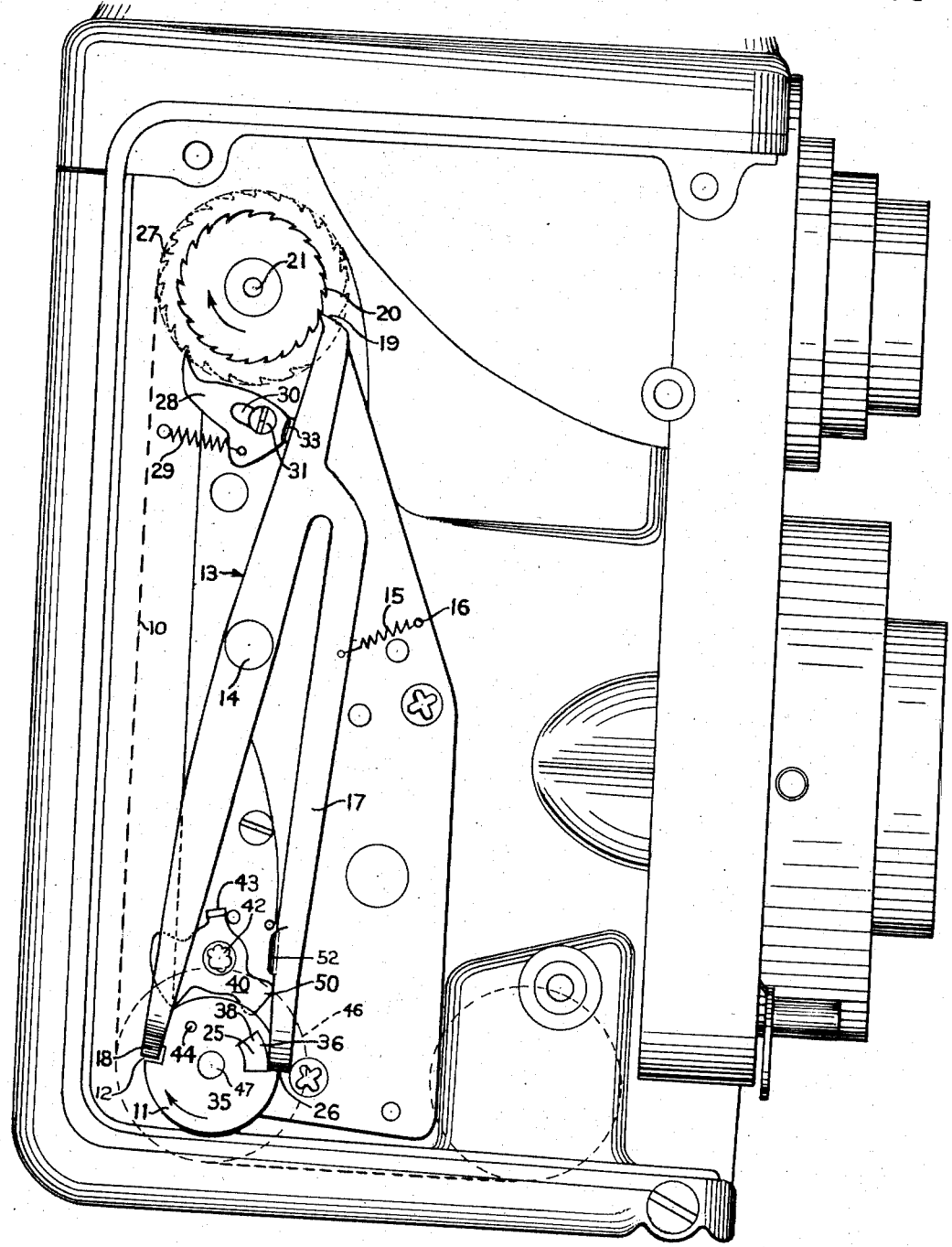
Fig. 1 is a side elevation view of a roll film camera, with the side plate removed, showing the film metering mechanism, and the relation thereto of the reload lever of the present invention, the parts being in position to lock the wind-up spindle at the end of a film movement.

As is common and well known practice, a film strip 10 is wound successively from a supply spool across an exposure area and is finally wound up on a takeup spool. During this passage across the camera, the film engages a measuring roll which is rotated with and in timed relation with the film movement. As such structures are well known and form no part of the present invention, they are not designated or described. However, the shaft of the measuring roll has mounted thereon a metering disk 11 which is of such a size as to make a single complete revolution when the film strip has been moved the distance of one image area, all of which is deemed apparent to those skilled in the art.

The disk 11 is formed with a radially extended open-end slot or notch 12, the purpose of which will be later described. A locking or forwarding pawl 13 is pivoted at 14 on the camera. A spring 15 has one end anchored at 16 to the camera and the other end fastened to an arm or lever 17 formed from the material of the pawl 13, as clearly shown in the drawings. The spring 15 tends to rock the pawl 13, with its arm 17, in a counterclockwise direction, about pivot 14, to move a lug 18 on the lower end of the pawl 13 into engagement with the periphery of disk 11. The other or upper end of pawl 13 is formed with a tooth 19 adapted to engage a ratchet 20 fixed to the takeup spindle 21 to lock the latter against further movement at the end of each film-winding operation. As mentioned above, disk 11 makes one revolution when the film strip is moved the distance of one image area. At this time, the notch 12 has been moved into registry with lug 18, and the pawl 13 rocks, under the action of spring 15, to move the lug 18 into notch 12. Such rocking simultaneously moves tooth 19 into locking relation with ratchet 20 locking spindle 21 against further rotation, as shown in Fig. 1. The disk 11 is also provided with an axially extending opening or recess 25 with which a bent-up lug 26 on the free end of arm 17 is adapted to cooperate, in a manner and for a purpose to be later described.

After the tooth 19 engages ratchet 20, as above described, the film is ready for an exposure, and the shutter may be operated to expose the positioned film area. After making the exposure, it is now necessary to wind up the exposed film. It is noted, however, that the parts are in a position shown in Fig. 1 and the takeup spindle is locked. Therefore, it is necessary to move the tooth 19 of pawl 13 out of holding relation with ratchet 20 before the exposed film can be wound up. Obviously, this can be acomplished by imparting a clockwise rotation to pawl 13. Such rotation will not only disengage tooth 19 from ratchet 20 to free spindle 21, but also will withdraw the lug 18 out of notch 12 of disk 11 to free the latter.

While a plurality of arrangements may be utilized to impart such clockwise rotation to pawl 13, it is preferred to secure such rotation by means of a reverse rotation of the winding spindle so that the latter not only serves to wind up the film when rotated in one direction, but also to release the holding pawl 13 when rotated in the opposite direction. In winding the film, the spindle 21 is rotated in a clockwise direction, as indicated by the arrow in Fig. 1. When, however, the pawl 13 is to be used to disengage the spindle 21, the latter is rotated in the opposite or counterclockwise direction. In order that the spindle may be effectively released, the spindle has mounted thereon a second ratchet 27 which is engaged by a release pawl 28 held in engagement with ratchet 27 by means of a spring 29. The pawl 28 is formed with a slot 30 to mount the pawl 28 slidably on a stud 31 which extends through a slot 32. When the pawl 13 is in locked relation with ratchet 20, an ear 33 on the lower end of the reverse pawl 28 is in substantial engagement with pawl 13, see Fig. 1. Now, after an exposure has been made, the spindle 21 is rotated, by means of a knob, not shown, in a counterclockwise direction. This movement causes ratchet 27 to engage pawl 28 to slide the latter to the right as shown in Fig. 1 and into positive engagement with pawl 13. Further rotation of the spindle will cause ear 33 to rock pawl 13 clockwise about pivot 14 to disengage tooth 19 from ratchet 20, and simultaneously withdraw lug 18 from notch 12. The parts are then in the position shown in Fig. 2.

While the spindle 21 is now unlocked, it is apparent that as the winding knob is now released, the spring 29 will return pawl 28 to its original position to free pawl 13. Spring 15 will then become operative again to rock pawl 13 in a counterclockwise direction and back to the position shown in Fig. 1, to again lock the spindle. Therefore, it is apparent that when the spindle has been turned to release pawl 13, some means must be provided to retain the latter in its released position.

To secure this result, pawl 13 has formed from the material thereof the auxiliary cantilever arm or holding member 17 which is arranged along side of pawl 13. The free end of arm 17 is formed with a lug or ear 26. Now, when the pawl 13 is rocked in a counterclockwise direction by pawl 28, as above described, the lug 26 will move radially and inwardly, or to the left, across the face 35 of disk 11 and will finally drop into the opening or recess 25, as shown in Fig. 2. When the lug 26 drops into recess 25, it will engage the side wall or edge 36 thereof. The latter forms, in effect, a holding abutment or shoulder which retains the lug 26 in position in the recess 25. Such retention serves to maintain the lug 18 away from the periphery 37 of the disk 11 and out of the slot 12, as shown in Fig. 2. In this position of pawl 13, the tooth 19 is maintained out of engagement with the ratchet 20, and the spindle 21 is free and may be rotated to wind up the exposed image area.

As the spindle 21 is now rotated, the exposed film is moved across the camera and wound up on the takeup spindle, as is apparent. Such movement will impart a clockwise rotation to the disk 11. As the film winding continues, the notch 12 is moved out of registry with the lug 18. At the same time, the trailing edge 38 of the opening 25 finally engages lug 26 to lift or cam the latter out of the recess 25 to free pawl 13. The spring 15 then becomes operative to impart a slight counterclockwise rotation to pawl 13 to move lug 18 into engagement with the periphery 37 of disk 11, as shown in Fig. 3. The film winding continues; and, at the end of the film-winding operation, the notch 12 is again brought into registry with lug 18 and the latter moves into the notch, under the action of spring 15, as shown in Fig. 1. Such movement serves to shift tooth 19 into locking relation with the ratchet 20 to arrest further movement of the spindle 21. Thus, at the end of each winding operation, the takeup spindle is positively and automatically locked against further rotation.

It is thus apparent that the disk 11 serves to control the movement of the pawl 13 so that the latter is moved into a locking or holding relation with a takeup spindle at the end of each winding operation. In addition, the recess 25 of the disk 11 cooperates with the lug 26 of the arm 17 to hold the pawl 13 temporarily out of co-operating relation with disk 11 during the initial portion of the film-winding operation. Thereafter, the lug 26 is cammed automatically out of recess 25 so that the lug 18 of pawl 13 may again cooperate with slot 12 to lock the windup spindle at the end of the film-winding operation. Thus, the disk 11 acts both as a control means and as a holding means for pawl 13.

After the last exposure has been made, it is desirable to retain the pawl 13 in its released position, as shown in Fig. 2, to permit the unobstructed turning of the spindle 21 to wind up the trailer and leader strips, as is deemed apparent. To secure this result, the present invention provides a manually controlled reload lever 40 which is staked or otherwise secured to a pin or stud 41 rotatably secured to the camera housing. The upper end of stud 41 is provided with a roughened finger piece 42 by which the stud 41 and lever 40 may be moved selectively from the position shown in Figs. 1-3 to that shown in Fig. 4, or vice versa. The reload lever 40 is normally in the position shown in Figs. 1-3, and is inoperative. When, however, the last exposure has been made, the finger piece 42 is grasped and turned in a counterclockwise direction to move the lever 40 to the position shown in Figs. 4 and 6.

Such counterclockwise movement of the lever 40 serves to bring a lug or ear 43 formed thereon into engagement with pawl 13 to impart a clockwise rotation thereto to move the pawl from its locked position, shown in Fig. 1, to its released position shown in Fig. 4, to free the spindle to permit free winding of the trailer and leader strips. During such winding, it is desirable to retain the disk 11 against rotation so as to hold the disk in its proper phased relation to pawl 13 so that when the first image area of a new roll of film is positioned in the camera, the lever 40 may be returned to its inoperative position and the lug 18 will move into notch 12 to lock the spindle 21. For this reason, the disk 11 is maintained stationary and in its proper phased relation during the winding of the trailer and leader strips.

To secure this phasing of the disk 11, the latter is formed with a depending pin 44 which is in the position shown in Fig. 4 after the last exposure has been made. The reload lever 40 is formed with a curved or arcuate blocking surface 45, which, when the lever 40 is moved to the position shown in Fig. 4, engages and is positioned in the path of pin 44 to hold disk 11 against rotation, yet permit rotation of the film measuring member 46 during the winding of the trailer and leader strips. The member 46 is connected frictionally to the disk 11 in any suitable and well known manner. For example, the member 46 may be mounted loosely on the measuring shaft 47 which carries disk 11. A friction coupling 48 serves to connect shaft 47 and disk 11 releasably to member 46. By means of this arrangement, a slip or friction coupling is provided between the disk 11 and the member 46 so that the disk 11 may be held stationary while the member 46 rotates during the winding of the trailer and leader strips. Obviously, other forms of slip or friction couplings may be provided, and the particular form shown is not intended as a limitation, but merely as illustrating one suitable form. As the disk 11 is held stationary, it is apparent that its proper phased relation will be maintained so that it will be in proper position when the first image area of the new film has been moved into position, the advantage of which will be readily apparent to those familiar with devices of this type.

The blocking surface 45 also provides further advantages. Suppose, for example, that when the camera back is open, the operator inadvertently rotates shaft 47 in a counterclockwise direction. Such rotation obviously will move disk 11 from its proper phased relation, as shown in Fig. 4. In this position the pin 44 will no longer engage the blocking surface 45 so the latter will be ineffective to hold disk 11 against rotation. However, when the camera back is closed and the leader strip is wound, the disk 11 will be directly connected to the member 46 and will be rotated as a unit therewith. Such rotation of disk 11 will continue until the pin 44 finally engages surface 45, whereupon the disk 11 will be held against further rotation. Thus, irrespective of the position of the disk 11 and slot 12 when the camera back is closed the slot will be properly positioned, as shown in Fig. 4, before the completion of the winding of the leader strip, so that the disk 11 will be positioned positively and automatically in the proper and required phased relation before the first image area of the new film strip has been moved into position.

At this time the disk 11 and pawl 13 are in a position shown in Fig. 4. It is apparent, however, that the lug 26 overlies opening 25 and if the reload lever 45 were now returned to its inoperative position, as shown in Figs. 1-3, the lug 26 would engage in opening 25 and retain the pawl 13 in its release position as shown in Figs. 2 and 4. Obviously, in this position, the lug 18 will not move into notch 12 and tooth 19 will not engage the ratchet 20 and the spindle will not be locked when the first image area is positioned.

In order to eliminate such a possibility, the reload lever 40 is formed with an arm 50 adapted to engage an inclined or bevel undersurface 51 of a down-turned lug 52 depending from arm 17, as best shown in Figs. 5 and 6. Now, as the lever 40 is rotated to the position shown in Fig. 4, the arm 50 will engage surface 51 to cam or lift arm 17 upwardly and out of holding relation with opening 25, as shown in Fig. 6. The parts are so designed that as the lever 40 is returned to its inoperative position, Figs. 1-3, the member 45 first moves out of engagement with pawl 13, allowing the latter to rock counterclockwise, under the action of spring 15, to move lug 18 into notch 12. When the pawl 13 has been moved sufficiently to shift lug 26 to the right and out of registry with opening 25, the arm 50 then moves out of contact with the surface 51 and lug 26 will then drop onto the face 35 of the disk 11. However, at the same time the pawl 13 has been moved into locking relation and the spindle 31 is locked, as is desired. By means of this arrangement, the lug 26 is held in an inoperative position until the pawl 13 has been moved into locking position, thus, assuring that the spindle will be locked when the first image area is in position and the reload lever has been moved to its inoperative position, Figs. 1–3.

Thus, the reload lever 40 serves to move the pawl 13 out of locking relation after the last exposure has been made to permit the unobstructed winding of the trailer and leader strips. In addition, the disk 11 is held or positioned so that the notch 12 of the disk will be in proper phased relation with the lug 18 of the pawl 13 when the first image area of the new roll of film is positioned in the camera. Finally, arm 50 of the reload lever 40 retains lug 26 in an inoperative position to permit positive and automatic locking of the winding spindle when the lever 40 is rocked to its inoperative position. Thus, the lever 40 holds pawl 13 in its released position, and properly phases disk 11.

The present invention thus provides a metering disk which controls the movement of the pawl 13 so that the latter will be moved into locking relation with the windup spindle only at the end of each winding operation. In addition, the metering disk provides means for holding the pawl temporarily out of cooperating relation of the disk during the initial portion only of the winding operation so as to prevent inadvertent and unintentional locking of the winding spindle before the end of the winding operation. In addition, the present invention provides a reload lever which is manually positioned at the end of the last exposure, or some desired number of exposures, to move the locking pawl to an inoperative position and also to retain the metering disk in its proper phased relation. The reload lever has been described as being used only after the last exposure has been made to release the pawl 13 to permit unobstructed winding of the trailer strip. It is apparent, however, that the lever 40 may be moved to its operative position even when a roll has been only partially exposed, and the unexposed images as well as the trailer strip may then be wound off so as to permit a partially exposed roll to be removed from the camera. If desired, the partially exposed roll may be later placed in the camera. In such a case the lever 40 would be moved to its operative position and the previously exposed image areas will be wound off and then the lever 40 will be turned to its inoperative position and the moving and locking means will then become effective to lock the spindle at the end of each succeeding winding operation.

While certain embodiments of the invention have been disclosed, it is to be understood that the inventive idea may be carried out in a number of ways. Therefore, the present invention is not to be limited to the precise details described, but is intended to cover all modifications and variations thereof which fall within the scope of the appended claims.

I claim:

1. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, and holding means on said disk engaging said pawl to retain the latter out of locking relation with said ratchet.

2. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, and a shoulder on said disk engageable by said pawl when the latter is moved in said opposite direction to retain said pawl out of locking relation with said ratchet.

3. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, a shoulder on said disk engageable by said pawl when the latter is moved in said opposite direction to retain said pawl out of locking relation with said ratchet, and means on said disk for releasing said pawl to render said lug operative to cooperate with said disk to move said pawl into locking relation with said ratchet when a predetermined length of film has been wound.

4. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, a holding lever on said pawl, and means on said disk engaging said lever when said pawl has been moved in said opposite direction to retain said pawl out of locking relation with said ratchet.

5. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, a holding lever on said pawl, means on said disk engaging said lever when said pawl has been moved in said opposite direction to retain said pawl out of locking relation with said ratchet, and means on said disk for releasing said lever to allow said lug to cooperate with said disk.

6. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, a holding lever formed on said pawl and movable radially across said disk when said pawl is moved in said opposite direction, a holding shoulder formed on said disk and positioned in the path of said lever when the latter is moved across said disk to engage said lever to retain said pawl out of locking relation with said ratchet, and a cam on said disk movable into engagement with said lever upon rotation of said disk by the movement of said film strip to move said lever out of holding relation with said shoulder to permit said lug to move into cooperating relation with said disk.

7. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl out of locking relation with said ratchet, and means independent of said last-mentioned means for moving said pawl out of locking relation with said ratchet.

8. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl to withdraw said lug out of said notch and to shift said pawl out of locking relation with said ratchet, means on said disk engaging said pawl to retain the latter out of locking relation with said ratchet, and means independent of said pawl-moving means for engaging and moving said pawl out of locking relation with said ratchet.

9. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl to withdraw said lug out of said notch and to shift said pawl out of locking relation with said ratchet, means on said disk engaging said pawl to retain the latter out of locking relation with said ratchet, and a manually controlled element movable to engage said pawl to move and hold said pawl out of locking relation with said ratchet independently of pawl moving and retaining means.

10. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl out of locking relation with said ratchet, means independent of said last-mentioned means for moving and holding said pawl out of locking relation with said ratchet to allow winding of trailer and leader strips, and means engaging said disk directly to prevent rotation of said disk during the winding of the trailer and leader strips to phase said disk.

11. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl out of locking relation with said ratchet, and a rockable member independent of said last-mentioned means movable into engagement with said pawl to move the latter out of locking relation with said ratchet to free said spindle to permit unobstructed winding of trailer and leader strips and simultaneously to engage and lock said disk against rotation to phase said disk.

12. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl out of locking relation with said ratchet, means independent of said last-mentioned means for moving and holding said pawl out of locking relation with said ratchet to allow winding of trailer and leader strips, a pin projecting from the face of said disk, and means adapted to engage said pin to hold said disk against rotation during the winding of the trailer and leader strips to phase said disk.

13. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means to move said pawl out of locking relation with said ratchet, a holding lever formed on said pawl and movable radially across said disk when said pawl is moved out of locking relation, a holding shoulder formed on said disk and positioned in the path of said lever when the latter is moved across said disk to engage said lever to retain said pawl out of locking relation with said ratchet, a cam on said disk movable into engagement with said lever upon rotation of said disk by the movement of said film strip to move said lever out of holding relation with said shoulder to permit said lug to move into cooperating relation with said disk, a rockable member positioned adjacent said disk, a lug on said member positionable to engage said pawl to move the latter out of locking relation with said ratchet when said member is moved in one direction to free said spindle to permit winding of trailer and leader strips, a cam on said member adapted to engage said holding lever to retain the latter out of holding relation with said shoulder, and means on said member to hold said disk against rotation during the winding of said trailer and leader strips to phase said disk.

14. In a roll-film camera, the combination with a rotatable take-up spindle adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said pawl out of locking relation with said ratchet, a holding lever formed on said pawl and movable radially across said disk when said pawl is moved out of locking relation, a holding shoulder formed on said disk and positioned in the path of said lever when the latter is moved across said disk to engage said lever to retain said pawl out of locking relation with said ratchet, a cam on said disk movable into engagement with said lever upon rotation of said disk by the movement of said film strip to move said lever out of holding relation with said shoulder to permit said lug to move into cooperating relation with said disk, a rockable member positioned adjacent said disk, a lug on said member positionable to engage said pawl to move the latter out of locking relation with said ratchet when said member is moved in one direction to free said spindle to permit winding of trailer and leader strips, a cam on said member adapted to engage said holding lever to retain the latter out of holding relation with said shoulder, a pin projecting from the face of said disk, and a blocking portion on said member positionable to engage said pin to hold said disk against rotation during the winding of said trailer and leader strips to phase said disk.

HOWARD T. HODGES.

References Cited in the file of this patent

UNITED STATES PATENTS

| Number | Name | Date |
|---|---|---|
| 2,063,331 | Nagel | Dec. 8, 1936 |
| 2,090,017 | Young | Aug. 17, 1937 |
| 2,356,560 | Baumgartner | Aug. 22, 1944 |